(12) United States Patent
Watanabe

(10) Patent No.: US 8,317,337 B2
(45) Date of Patent: Nov. 27, 2012

(54) PROJECTOR

(75) Inventor: Toshimitsu Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 411 days.

(21) Appl. No.: 12/711,396

(22) Filed: Feb. 24, 2010

(65) Prior Publication Data

US 2010/0225888 A1    Sep. 9, 2010

(30) Foreign Application Priority Data

Mar. 3, 2009 (JP) ................................. 2009-048924

(51) Int. Cl.
*G03B 21/14* (2006.01)
*G03B 21/16* (2006.01)
(52) U.S. Cl. ............................. 353/61; 353/57; 361/695
(58) Field of Classification Search ..................... 353/57, 353/58, 60, 61, 119, 52; 361/676, 678, 679.46, 361/679.48, 690, 694, 695
See application file for complete search history.

(56) References Cited

U.S. PATENT DOCUMENTS

| | | | |
|---|---|---|---|
| 7,320,524 B2* | 1/2008 | Lee et al. | 353/60 |
| 2009/0279056 A1* | 11/2009 | Belliveau et al. | 353/119 |
| 2010/0007856 A1* | 1/2010 | Fujisaki et al. | 353/52 |
| 2011/0299040 A1* | 12/2011 | Nishihata et al. | 353/52 |
| 2011/0299041 A1* | 12/2011 | Nishihata et al. | 353/52 |
| 2011/0299042 A1* | 12/2011 | Nishihata et al. | 353/52 |
| 2011/0299043 A1* | 12/2011 | Nishihata et al. | 353/52 |
| 2011/0299045 A1* | 12/2011 | Kotani | 353/57 |
| 2012/0086918 A1* | 4/2012 | Furumi | 353/52 |
| 2012/0099087 A1* | 4/2012 | Sakuma et al. | 353/119 |

FOREIGN PATENT DOCUMENTS

| | | |
|---|---|---|
| JP | 05-095625 U | 12/1993 |
| JP | 09-139583 A | 5/1997 |
| JP | 10-110980 A | 4/1998 |
| JP | 2001-063357 A | 3/2001 |
| JP | 2008-082442 A | 4/2008 |
| JP | 2008-227289 A | 9/2008 |
| JP | 2009-003317 A | 1/2009 |
| JP | 2010-019927 A | 1/2010 |

* cited by examiner

*Primary Examiner* — William C Dowling
(74) *Attorney, Agent, or Firm* — AdvantEdge Law Group, LLC

(57) ABSTRACT

A projector configured to modulate a luminous flux emitted from a light source in accordance with image information, forms an image light, and projects the image light, includes: an exterior housing having an intake vent for taking in the ambient air, and an insertion slot communicating with the intake vent; an anti-dust filter being installed in the exterior housing so as to be mountable in and removable from the exterior housing through the insertion slot, prevents dust from intruding into the exterior housing from the intake vent; and a cover configured so as to be switchable between an open condition in which it exposes the insertion slot, and a closed condition in which it covers the insertion slot.

4 Claims, 11 Drawing Sheets

PROJECTOR

BACKGROUND

1. Technical Field

The present invention relates to a projector which projects an image light.

2. Related Art

Heretofore, a projector has been known configured to modulate a luminous flux emitted from a light source in accordance with image information, forms an image light, and projects the image light onto a screen, or the like. The projector is used for various purposes such as a presentation in a company, or an appreciation of movies at home. With the light source of the projector, there is a possibility that a lighting thereof is accompanied by a rise in temperature of the light source itself, internal optical parts, and the like, reducing the performances and functions of these parts. In order to suppress the rise in temperature of the internal parts, many projectors are configured so that an intake vent is provided in an exterior housing, and the ambient air is taken in from the intake vent, cooling the internal parts. An anti-dust filter (a filter device) is provided in the intake vent in such a way that dust mixed with the ambient air does not intrude into the exterior housing (refer to, for example, JP-A-2009-3317).

A projector described in JP-A-2009-3317 includes an exterior housing having an intake vent (a first opening) and an insertion portion, and an anti-dust filter. The insertion portion has a second opening and a guide, and the anti-dust filter is inserted into the insertion portion by being slid thereinto from the second opening.

However, the projector described in JP-A-2009-3317 has a problem in that an exposure of the anti-dust filter and edge of the second opening impairs an appearance design, or reduces a degree of appearance design freedom. Also, in order to improve the appearance design, it is necessary to prepare anti-dust filters of shapes, colors, and the like, corresponding to exterior housings of various specifications, and there is a problem in that an inventory control, post-sale serviceability, and the like, accompanying an increase in kinds of anti-dust filter become cumbersome and complicated.

SUMMARY

An advantage of some aspect of the invention is to solve at least a part of the problems mentioned above and the invention can be realized as the following aspects or application examples.

APPLICATION EXAMPLE 1

A projector according to an application example configured to modulate a luminous flux emitted from a light source in accordance with image information, forms an image light, and projects the image light, includes an exterior housing having an intake vent for taking in the ambient air, and an insertion slot communicating with the intake vent; an anti-dust filter being installed in the exterior housing so as to be mountable in and removable from the exterior housing through the insertion slot, prevents dust from intruding into the exterior housing from the intake vent; and a cover configured so as to be switchable between an open condition in which it exposes the insertion slot, and a closed condition in which it covers the insertion slot.

According to the projector, the anti-dust filter is configured in such a way as to be removably installed, and the insertion slot through which the anti-dust filter is mounted and removed is configured in such a way as to be openable and closeable by the cover. That is, the insertion slot and anti-dust filter can be covered by the cover, except for when the anti-dust filter is replaced. By this means, with the projector, as well as it being possible to properly take in the ambient air over a long period by properly replacing the anti-dust filter, it is possible, in the closed condition, to achieve an improvement in appearance design.

Also, as the cover is configured so that it is possible, in the closed condition, to prevent the anti-dust filter from coming out of the insertion slot, the anti-dust filter is stably disposed in a predetermined position, and it is possible to reliably prevent the intrusion of dust.

APPLICATION EXAMPLE 2

With the projector according to the heretofore described application example, it is preferable that the cover includes a cover main body configured to cover the insertion slot, and arms extending from the cover main body are rotatably supported on the exterior housing.

According to the projector, the cover including the cover main body covering the insertion slot, and the arms, the arms are rotatably supported on the exterior housing. By this means, a user, by rotating the cover around the rotation axis of the arms, can easily switch the cover between the open condition and closed condition. Also, the cover, as the arms are supported on the exterior housing, can be configured in such a way as, in the open condition and closed condition, not to be separated from the exterior housing, thus preventing a loss of the cover, a damage thereof accompanied by the cover being handled separately, and the like, meaning that it is possible to stably provide the closed condition.

APPLICATION EXAMPLE 3

With the projector according to the heretofore described application examples, it is preferable that the intake vent is formed in a side surface of the exterior housing, that the insertion slot being adjacent to the intake vent, is configured in such a way that the anti-dust filter can be mounted and removed in a direction along the side surface, and that the cover is configured in such a way that an intake side end positioned on the intake vent side of the cover main body rotates with a rotational trajectory smaller than that of an opposed side end opposed to the intake side end.

According to the projector, the intake vent is formed in the side surface of the exterior housing, and the insertion slot, being adjacent to the intake vent, is configured in such a way that the anti-dust filter is mounted and removed in the direction along the side surface. That is, the insertion slot is formed in an upper surface or lower surface of the exterior housing configured to intersect with the side surface, and the anti-dust filter is mounted and removed from above or below the exterior housing. As the cover is formed in such a way as, in the closed condition, to cover the insertion slot, it is disposed in a top portion or bottom portion of the exterior housing in the vicinity of the intake vent. Then, the cover is configured in such a way that the intake side end positioned on the intake vent side of the cover main body rotates with a rotational trajectory smaller than that of the opposed side end opposed to the intake side end. That is, the cover, the rotation axis thereof being provided closer to the intake side end than to the opposed side end, is opened and closed in such a way that it is opened by a force in a direction in which the opposed side end moves sideward being applied to the cover, and closed by a force from the side being applied to the cover. By this means, in the event that, in the closed condition, a force is applied to the cover from the side when the user attempts to change a position of or lift the projector, a force in a closing direction is applied to the cover, meaning that it is possible to stably maintain the cover in the closed condition. Therefore, it is possible to achieve an improvement in handleability of the projector.

APPLICATION EXAMPLE 4

With the projector according to the heretofore described application examples, it is preferable that the cover has control portion configured to limit a movement from the opposed side end side to the intake vent side.

According to the projector, the cover has the control portion configured to limit the movement from the opposed side end side to the intake vent side. By this means, in the event that a force is applied to the cover in a direction from the opposed side end toward the intake vent when the user carries the projector by holding the vicinity of the side surface of the exterior housing, or the like, the cover is prevented from being displaced, deformed, or the like, meaning that it is possible to stably maintain the closed condition. Therefore, it is possible to achieve a further improvement in handleability of the projector.

APPLICATION EXAMPLE 5

With the projector according to the heretofore described application examples, it is preferable that the arms are formed as a pair on the same axis, and that the exterior housing includes restrainers provided between the pair of arms.

According to the projector, the arms are formed as a pair on the same axis. Also, the exterior housing includes the restrainers provided between the pair of arms. By this means, in the event that the cover main body bends due to a force applied when the cover is opened, and a force in a direction in which the pair of arms come close to each other is applied to the arms, the arms are prevented by the restrainers from being deformed, meaning that the arms are reliably supported on the exterior housing, enabling the cover to be stably opened and closed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
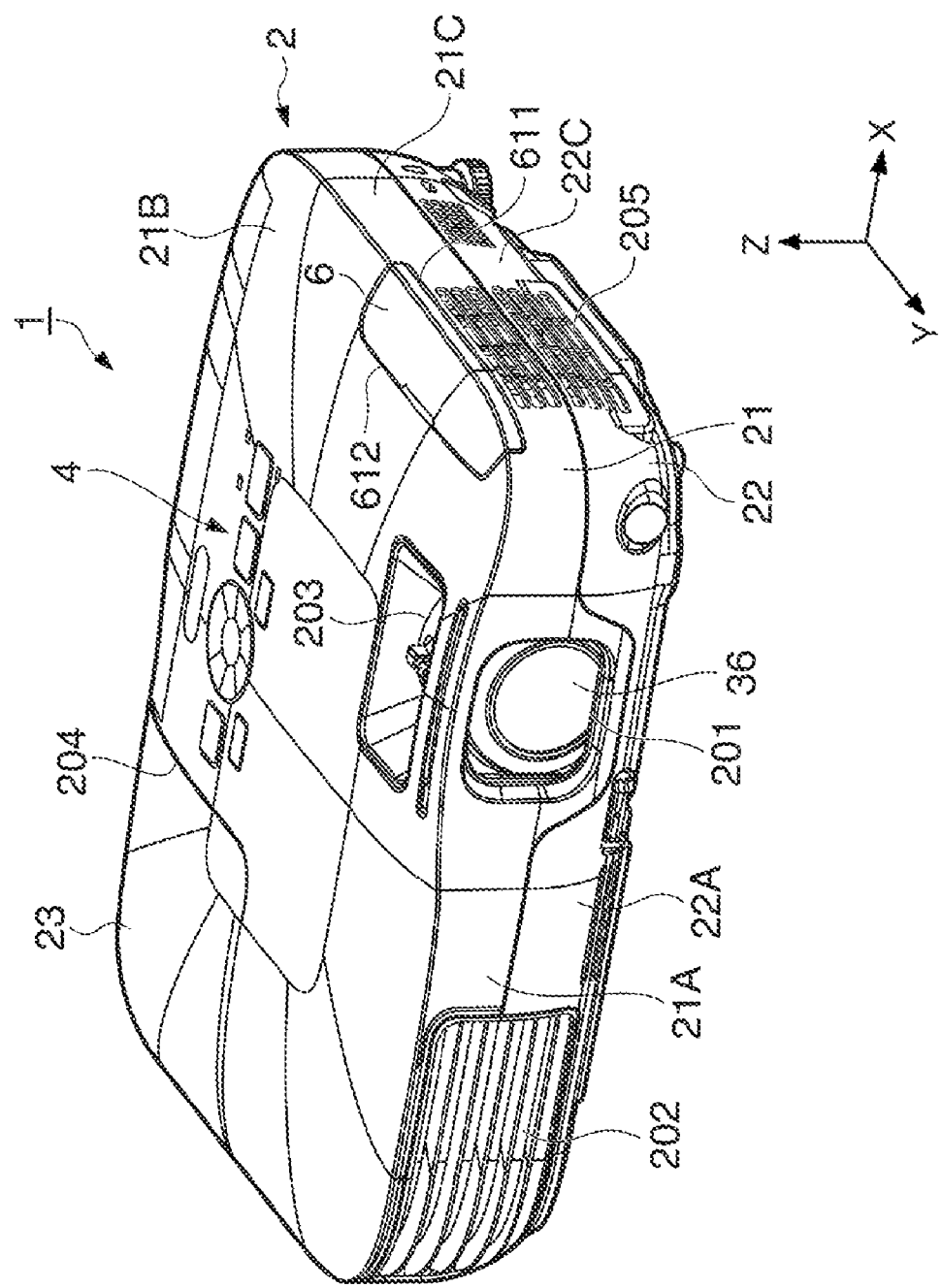
FIG. 1 is a perspective view showing an exterior of a projector of an embodiment of the invention.

Hereafter, a description will be given, referring to the drawings, of a projector according to an embodiment. The projector of the embodiment modulates a luminous flux emitted from a light source in accordance with image information, forms an image light, and enlarges and projects the image light onto a screen, or the like.

FIG. 1, being a perspective view showing an exterior of the projector of the embodiment, is a perspective view of the projector left in a position in which it has been placed on a desk, or the like. Hereafter, for convenience of description, a direction in which the image light is projected from the projector will be described as a front direction (a +Y direction), a right side, perpendicular to the Y direction, when viewed in FIG. 1 as a right direction (a +X direction), and an upper side, perpendicular to the X direction and Y direction, when viewed in FIG. 1 as an up direction (a +Z direction).

As shown in FIG. 1, the projector 1 is configured so that the main body thereof is surrounded by an exterior housing 2. Then, an optical unit 3 (refer to FIG. 2) having a light source 311, an unshown control section, a power supply device which supplies power to the light source 311 and control section, a cooling fan which cools the inside of the projector 1, and the like, are disposed in the exterior housing 2.

The exterior housing 2, being made of a synthetic resin, includes an upper case 21 configuring the upper portion, a lower case 22 configuring the lower portion, a lamp covering 23, and the like, and these are fixed by a screw, or the like. Also, each of the front surface, top surface, and side surfaces of the exterior housing 2 is formed having a curved surface.

As shown in FIG. 1, an opening 201 which is approximately rectangular, as seen from the front, is formed in a front surface 21A of the upper case 21, and a projection lens 36, acting as a projection optical device, included in the optical unit 3 is disposed on the inner side of the opening 201. Then, the image light emitted from the projection lens 36, passing through the opening 201, is projected to the front.

A rectangular opening is provided on the left side (a −X side) of the front surface of the exterior housing 2 configured of the front surface 21A, and a front surface 22A, of the upper case 21 and lower case 22 respectively, and a louver having an exhaust vent 202 is disposed in this opening. The exhaust vent 202 is configured of a plurality of rectangular through holes, and air in the exterior housing 2 warmed in accompaniment with a lighting of the light source is exhausted from the exhaust vent 202.

An opening 203 is formed in a vicinity of the opening 201 on a top surface 21B of the upper case 21, and a lever which operates a focus adjustment and zoom adjustment of the projection lens 36 is exposed from the opening 203.

Also, a plurality of openings are provided in portions of the top surface 21B at the back (in a −Y direction) of the opening 203, and keys of an input operation section 4 are exposed from these openings. The input operation section 4 includes a plurality of keys, and the like, for giving various kinds of instruction, such as a menu key which switches between a display and nondisplay of a menu image for carrying out various kinds of setting of the projector 1, and a source switching key which switches between input sources.

Furthermore, an opening 204 for replacing the light source device 31 (refer to FIG. 2) is formed on the back left side of the top surface 21B. The opening 204 is closed by the lamp covering 23 being mounted on the upper case 21.

An intake vent 205 for taking in the ambient air is provided in a side surface of the exterior housing 2 configured of right side surfaces 21C and 22C of the upper case 21 and lower case 22 respectively. The intake vent 205 is configured of a plurality of rectangular through holes, and the inside of the exterior housing 2 is cooled by the air taken in from the intake vent 205.

An openably and closeably supported cover 6 is disposed in a portion of the upper case 21 above the intake vent 205. An insertion slot 211 (refer to FIG. 3) is provided in an upper surface of the upper case 21 covered by the cover 6, and an anti-dust filter 5 (refer to FIG. 3) is mounted and removed through the insertion slot 211. Then, the anti-dust filter 5, being disposed on the inner surface side of the intake vent 205, prevents dust from intruding into the exterior housing 2 from the intake vent 205.

The cover 6 is configured in such a way as, in a closed condition, to cover the anti-dust filter 5 so as to prevent it from being exposed, and in an open condition, to allow the anti-dust filter 5 to be mounted and removed. The anti-dust filter 5 and cover 6 will be described in detail hereafter.

The control section, including a central processing unit (CPU), a read only memory (ROM), a random access memory (RAM), and the like, functions as a computer, and carries out a control of an operation of the projector 1, for example, a control relating to an image projection.

The optical unit 3 optically processes the luminous flux emitted from the light source under the control by the control section, and forms and projects an image light according to the image information.

Figure 2:
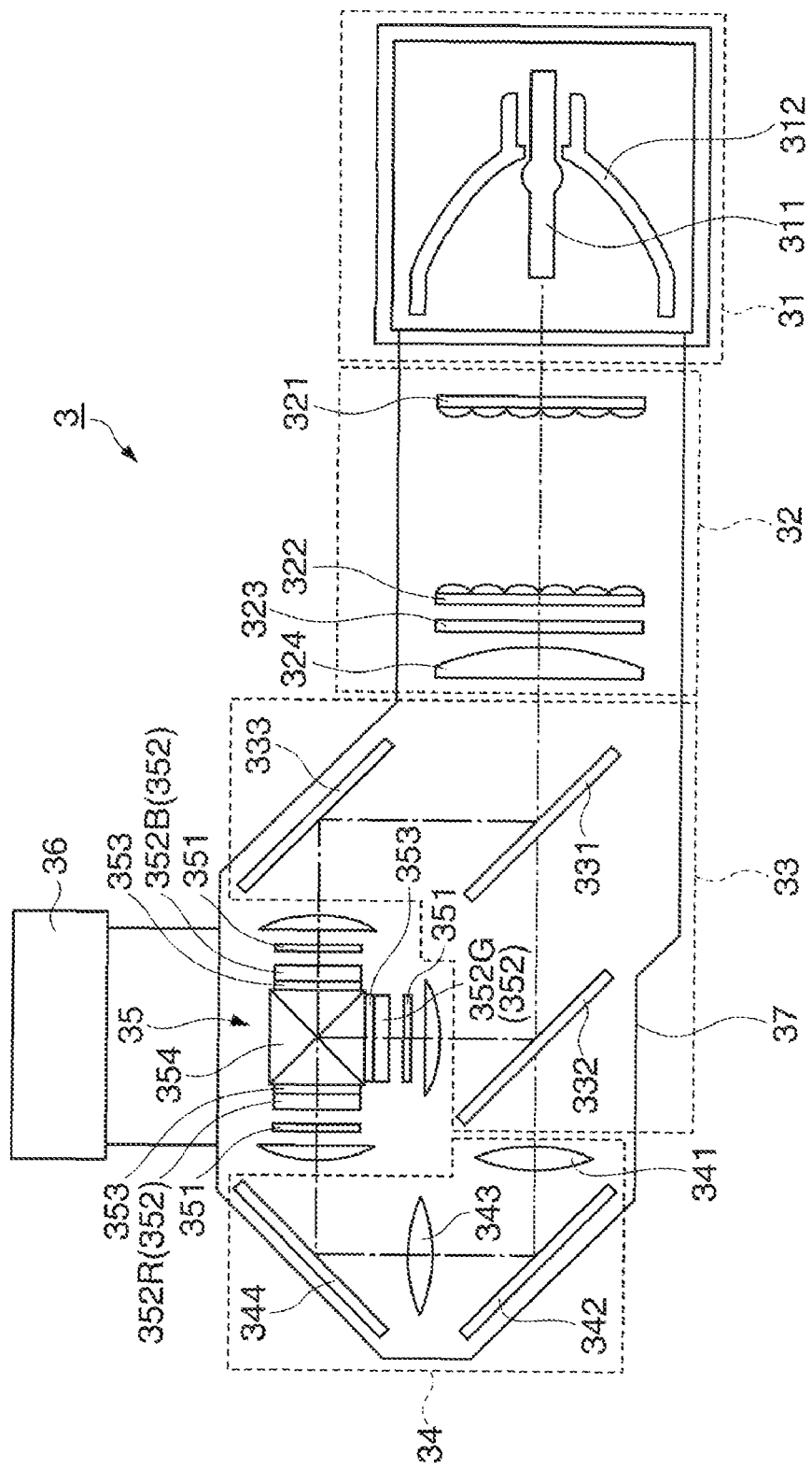
FIG. 2 is a diagram schematically showing an optical unit.

FIG. 2 is a diagram schematically showing the optical unit 3.

As shown in FIG. 2, the optical unit 3 includes the light source device 31, an illumination optical device 32, a color separation optical device 33, a relay optical device 34, an electrooptical device 35, the projection lens 36, and an optical part housing 37 in which these optical parts 31 to 36 are disposed in predetermined positions.

The light source device 31 includes a discharge type light source 311 configured of an ultrahigh pressure mercury-vapor lamp, a metal halide lamp, or the like, a reflector 312, and the like. Then, the light source device 31 aligns an emission direction of the luminous flux emitted from the light source 311 by means of the reflector 312, and emits the luminous flux toward the illumination optical device 32.

The illumination optical device 32, including a first lens array 321, a second lens array 322, a polarization modulation element 323, and a superimposing lens 324, optically processes the luminous flux emitted from the light source 311 in such a way as to approximately uniformly illuminate image formation areas of liquid crystal panels 352, to be described hereafter.

The color separation optical device 33, including two dichroic mirrors 331 and 332, and a reflecting mirror 333, has a function of separating the luminous flux emitted from the illumination optical device 32 into three color lights: a red color light (hereafter referred to as an R light), a green color light (hereafter referred to as a G light), and a blue color light (hereafter referred to as a B light).

The relay optical device 34, including an incidence side lens 341, a relay lens 343, and reflecting mirrors 342 and 344, has a function of guiding the R light transmitted through the second dichroic mirror 332 to an R light liquid crystal panel 352R. The optical unit 3 is configured so that the relay optical device 34 guides the R light but, not being limited to this, it is also acceptable to configure so that it guides, for example, the B light.

The electrooptical device 35, including an incidence side polarizing plate 351, the liquid crystal panels 352 as the optical modulation devices, an exit side polarizing plate 353, and a cross dichroic prism 354 as a color synthesis optical device, modulates each color light emitted from the color separation optical device 33 in accordance with the image information, and forms an image light.

The projection lens 36, being configured as a combined lens in which a plurality of lenses are combined, enlarges the image light formed by the electrooptical device 35, and projects it onto the screen.

Herein, a detailed description will be given of the insertion slot 211, anti-dust filter 5, and cover 6.

Figure 3:
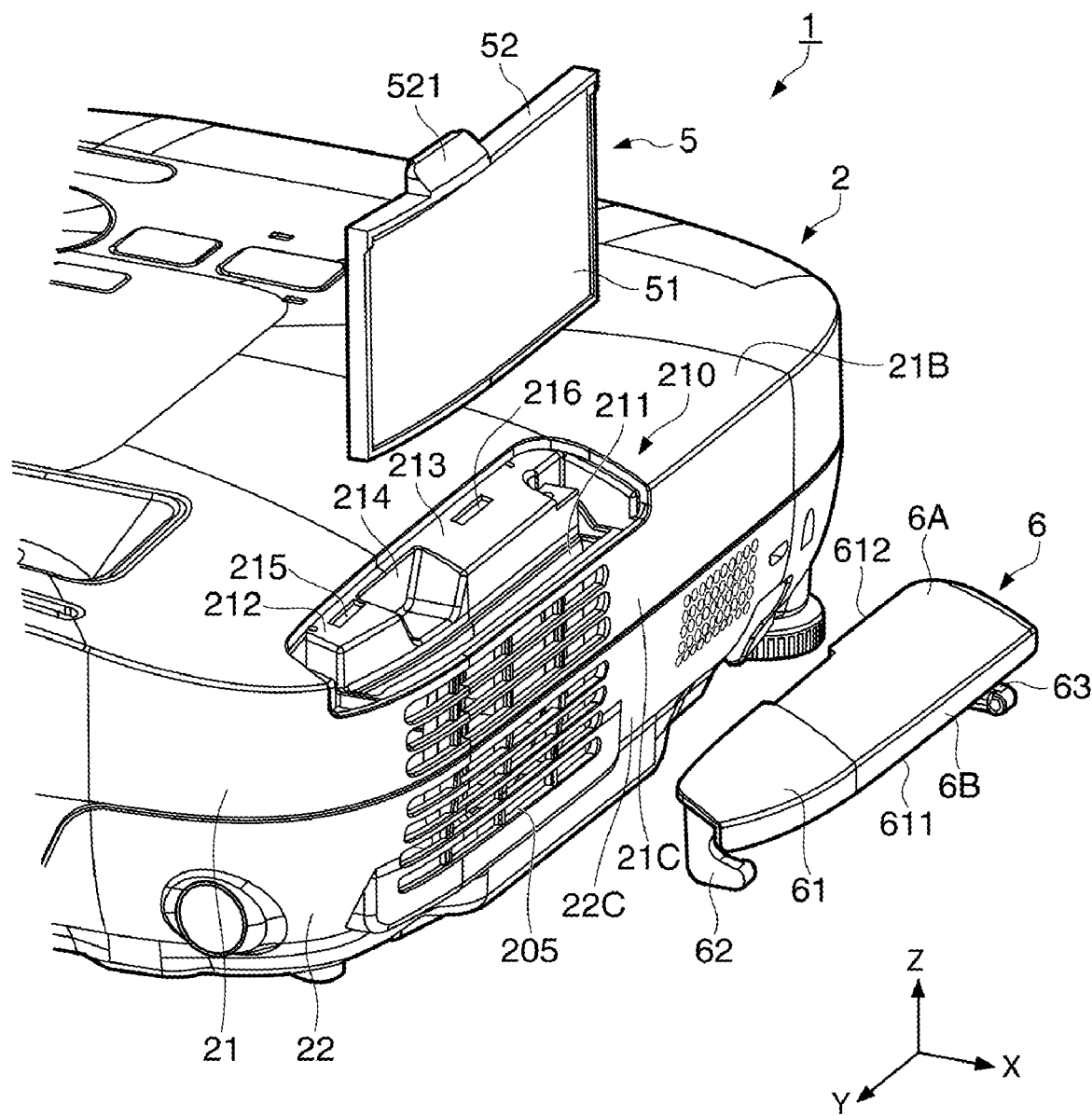
FIG. 3 is a perspective view showing a vicinity of an intake vent of the projector, showing a condition in which an anti-dust filter and a cover are separated.

Firstly, a detailed description will be given of the insertion slot 211 and a shape of a vicinity of the insertion slot 211. FIG. 3 is a perspective view showing a vicinity of the intake vent 205 of the projector 1, showing a condition in which the anti-dust filter 5 and cover 6 are separated.

As shown in FIG. 3, a cavity 210 being depressed with respect to the top surface 21B, is covered by the cover 6 is formed in a portion of the upper case 21 in the vicinity of the intake vent 205. The cavity 210, being formed from a portion of the side surface 21C above the intake vent 205 to one portion of the top surface 21B is provided so as to be greater in front-back direction (±Y direction) length than the intake vent 205.

The insertion slot 211 being provided in the vicinity of the side surface 21C, opens upward (in the +Z direction) is provided in the cavity 210. The insertion slot 211 being an opening through which the anti-dust filter 5 is mounted and removed, as previously described, is formed communicating with the intake vent 205. The insertion slot 211 being formed in a slit-like shape along the side surface 21C is formed having a curvature approximately the same as that of the side surface 21C.

The anti-dust filter 5 is mounted in the exterior housing 2 by being inserted from above the insertion slot 211, and the mounted anti-dust filter 5 is removed by being pulled out upward. In this way, the insertion slot 211 being provided adjacent to the intake vent 205 is configured in such a way that the anti-dust filter 5 can be mounted and removed in an up-down direction (a ±Z direction), that is, in a direction along the side surface 21C.

Also, a protrusion 212 positioned at the front, and a protrusion 213 positioned at the back, which are provided in a left direction (a −X direction) of the insertion slot 211, are formed in the cavity 210. Specifically, the protrusion 212 and protrusion 213 being depressed a predetermined distance with respect to the top surface 21B, protrude upward from the edge of the insertion slot 211. Then, the protrusion 212 and protrusion 213 are set in such a way as to be of a size such that a human fingertip can be inserted into a space (an operation space 214) formed by a distance at which they are separated from each other.

Rectangular holes 215 and 216, such that the front-back direction (±Y direction) is their longitudinal direction are formed in the upper surfaces of the protrusions 212 and 213, respectively. The rectangular holes 215 and 216, being provided in order that the cover 6 is not unduly moved when closed, are formed in such a way that they can make engagement with control portion 614 and 615 (refer to FIG. 8), to be described hereafter, of the cover 6.

Figure 4:
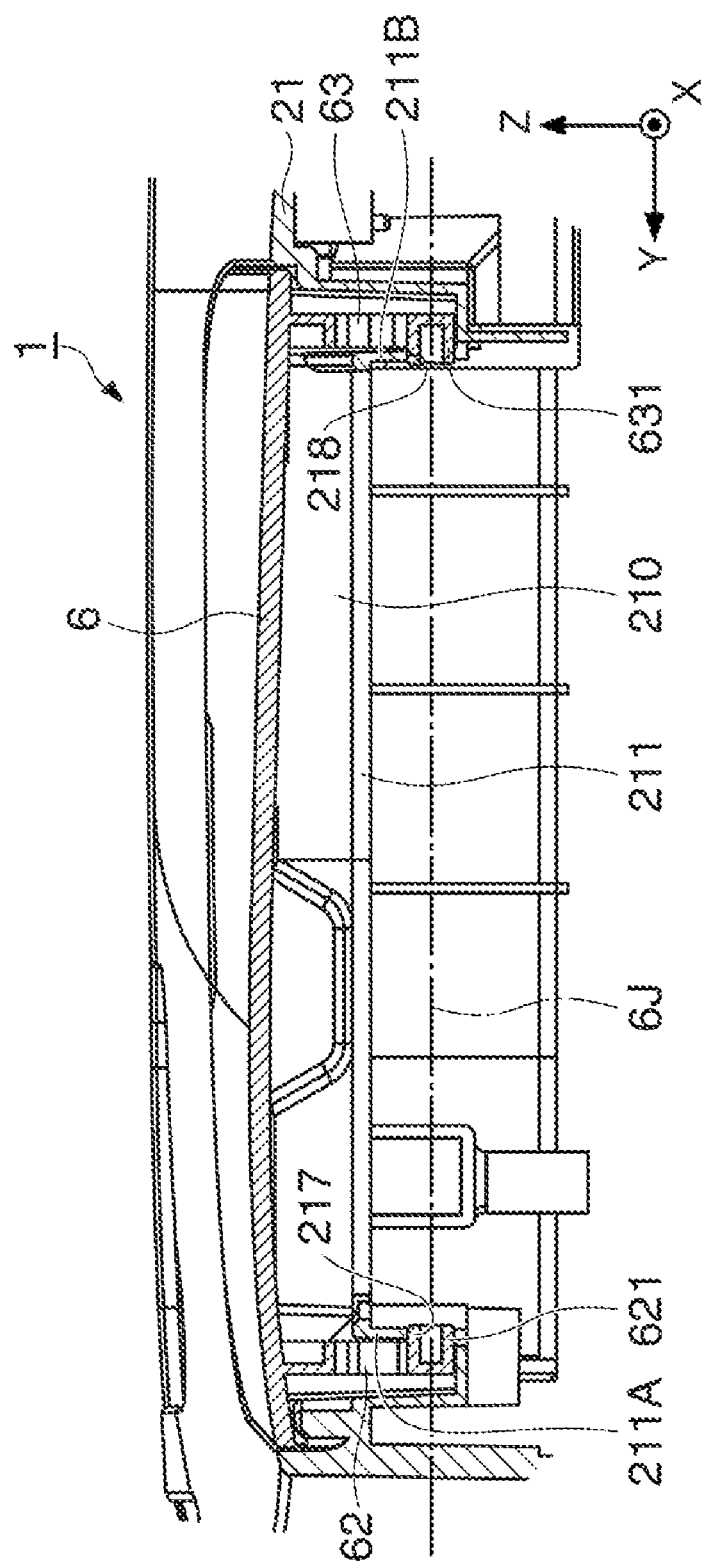
FIG. 4 is a sectional view of a vicinity of an insertion slot when the projector is seen from the right.

FIG. 4 is a sectional view of a vicinity of the insertion slot 211 when the projector 1 is seen from the right (+X direction).

As shown in FIG. 4, a front (+Y direction) wall (a restrainer 211A) and a back (−Y direction) wall (a restrainer 211B), which form the insertion slot 211 are provided in such a way as to be positioned between arms 62 and 63, to be described hereafter, of the cover 6. Through holes 217 and 218 passing through in the front-back direction are formed in the restrainers 211A and 211B, respectively. The through holes 217 and 218 are regions which respectively support supports 621 and 631, to be described hereafter, of the cover 6, in such a way that the supports 621 and 631 can rotate.

Figure 5:
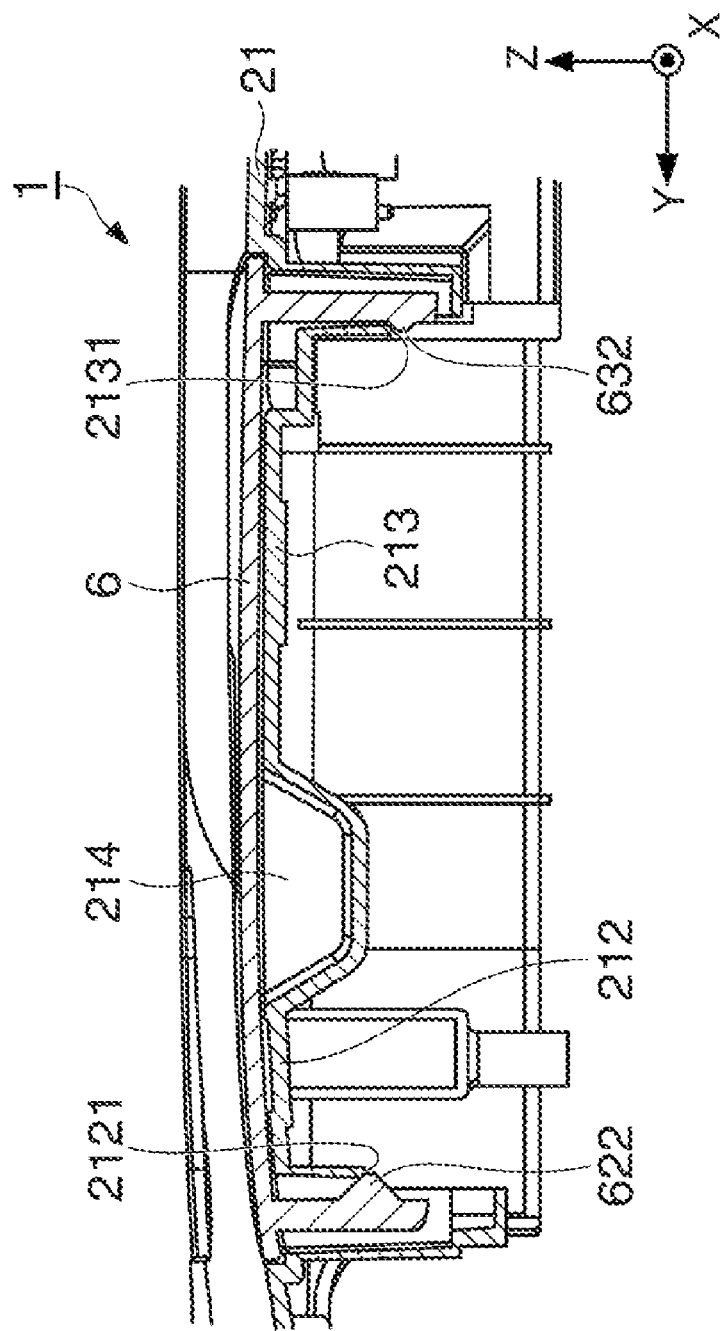
FIG. 5 is a sectional view of a vicinity of protrusions when the projector is seen from the right.

FIG. 5 is a sectional view of a vicinity of the protrusions 212 and 213 when the projector 1 is seen from the right (+X direction). As shown in FIG. 5, a hole (a latching hole 2121) passing through in the front-back direction is formed in a front (+Y direction) wall forming the protrusion 212, while a hole (a latching hole 2131) passing through in the front-back direction is formed in a back (−Y direction) wall forming the protrusion 213. The latching holes 2121 and 2131 are set in such a way that protrusions 622 and 632, to be described hereafter, of the cover 6 are latched one in each of them, maintaining the condition in which the cover 6 is closed.

Next, a detailed description will be given of the anti-dust filter 5.

Figure 6:
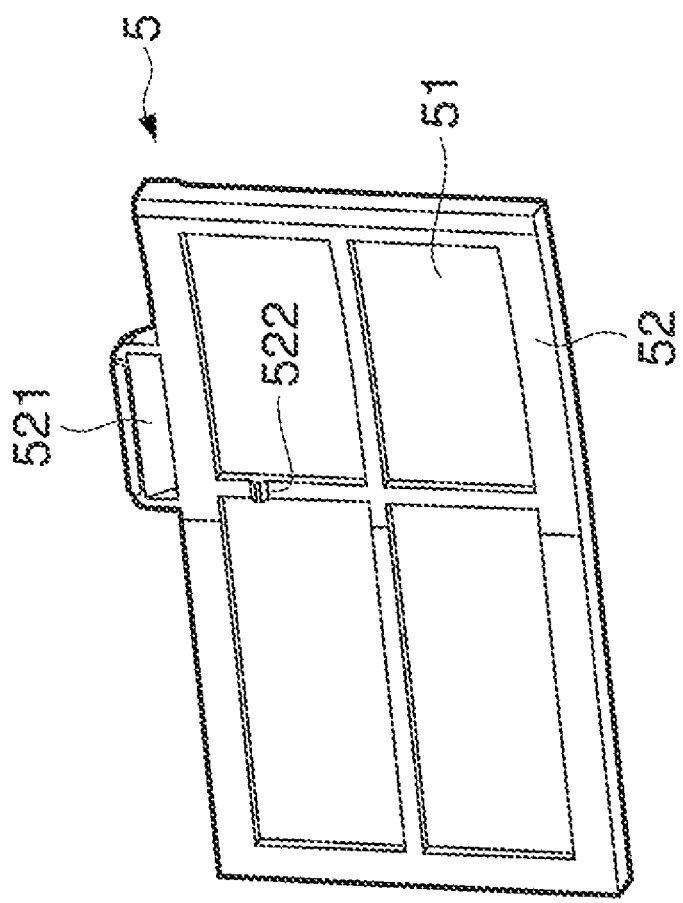
FIG. 6 is a perspective view of the anti-dust filter.

FIG. 6 is a perspective view of the anti-dust filter 5, showing the anti-dust filter 5 of FIG. 3 as seen from the left direction (−X direction).

The anti-dust filter 5, being configured including a filter main body 51 and a filter frame 52, as shown in FIGS. 3 and 6, is installed in such a way that it can be mounted in and removed from the exterior housing 2 through the insertion slot 211.

The filter main body 51 is formed in a rectangular parallelepiped shape from a member which, having permeability, prevents dust from passing through.

The filter frame 52, being made of a synthetic resin, is formed, in a frame-like shape, having a step around the outer edge in order to hold the entire outer edge of the filter main body 51, and provided with a plurality of through holes through which the air passes. The filter frame 52 has a shape following the curvature of the insertion slot 211 in such a way that it can be inserted into the insertion slot 211, as shown in FIG. 3. The filter main body 51 is disposed following the curvature of the filter frame 52 by the entire outer edge being attached to the filter frame 52 by means of an adhesive.

As shown in FIG. 6, a grip 521 protruding outward is provided on the filter frame 52. The grip 521 has a concave shape on the opposite side thereof from a side on which the filter main body 51 is attached. Then, the grip 521 is set in such a way as to be placed in a position adjacent to the operation space 214 of the cavity 210 when the anti-dust filter 5 is mounted in the exterior housing 2.

Also, a protrusion 522 protruding to the side opposite from the side on which the filter main body 51 is attached is formed on a portion, near to the grip 521, of one of bars of the filter frame 52 which are formed between the through holes.

The anti-dust filter 5 is mounted in the exterior housing 2 by being inserted from the insertion slot 211 in a position in which the side on which the filter main body 51 is attached faces rightward (the +X direction), and the grip 521 faces upward (the +Z direction), as shown in FIG. 3.

Figure 7:
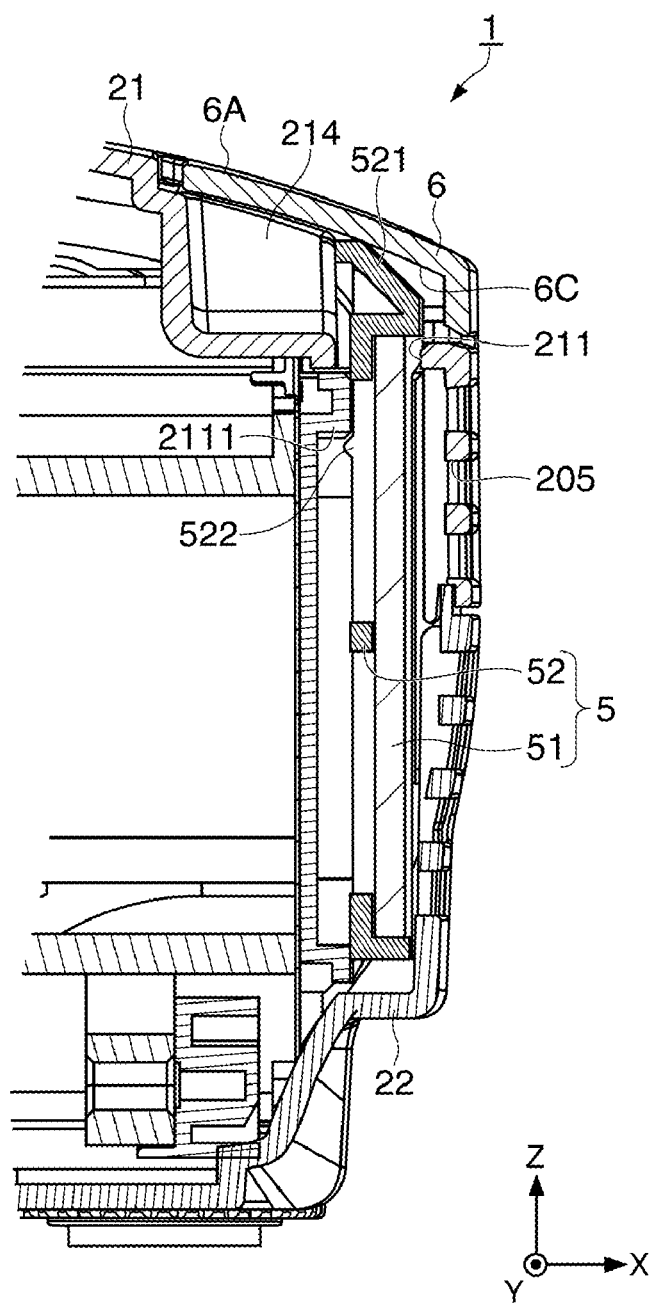
FIG. 7 is a sectional view of a vicinity of the insertion slot when the projector is seen from the front.

FIG. 7 is a sectional view of a vicinity of the insertion slot 211 when the projector 1 is seen from the front. Specifically, FIG. 7 shows a vicinity of the anti-dust filter 5 when the projector 1, in a condition in which the anti-dust filter 5 is mounted therein, is seen from the front.

As shown in FIG. 7, the anti-dust filter 5, on being inserted up to a position in which the protrusion 522 is brought into engagement with a step 2111 formed in the insertion slot 211, is disposed in a predetermined position on the inner surface side of the intake vent 205. Dust mixed with the ambient air taken in from the intake vent 205 is prevented by the anti-dust filter 5 from intruding into the exterior housing 2. The air filtered by passing through the anti-dust filter 5 cools the inside of the exterior housing 2. The anti-dust filter 5 is formed in such a way as to provide a clicking sensation when the protrusion 522 is brought into engagement with the step 2111.

Also, in the condition in which the anti-dust filter 5 is disposed in the predetermined position, as shown in FIG. 7, the grip 521 is disposed protruding to the right of the operation space 214. Then, the anti-dust filter 5 is configured in such a way as to be easily taken out, when the cover 6 is opened, by a user hooking his or her finger on the grip 521 through the operation space 214. Also, as shown in FIG. 7, the grip 521 is set in such a way as to make abutment with the cover 6 in the closed condition.

Next, a detailed description will be given of the cover 6.

The cover 6, being formed in such a way as to cover the cavity 210 is rotatably supported on the exterior housing 2, as previously described. Then, the cover 6 is configured in such a way as to be switchable between the condition in which it covers the cavity 210, that is, the closed condition in which it covers the insertion slot 211 and anti-dust filter 5, and the open condition in which it exposes the upper sides of the insertion slot 211 and anti-dust filter 5.

The cover 6, being made of a synthetic resin, has a cover main body 61 and the pair of arms 62 and 63, as shown in FIG. 3.

The cover main body 61, being a region which covers the cavity 210, has an upper surface 6A formed along the top surface 21B of the upper case 21, and a side surface 6B formed along the side surface 21C of the upper case 21. Then, as shown in FIG. 1, the cover 6 is configured so that the lower end (an intake side end 611) of the side surface 6B is disposed adjacent to the intake vent 205.

Figure 8:
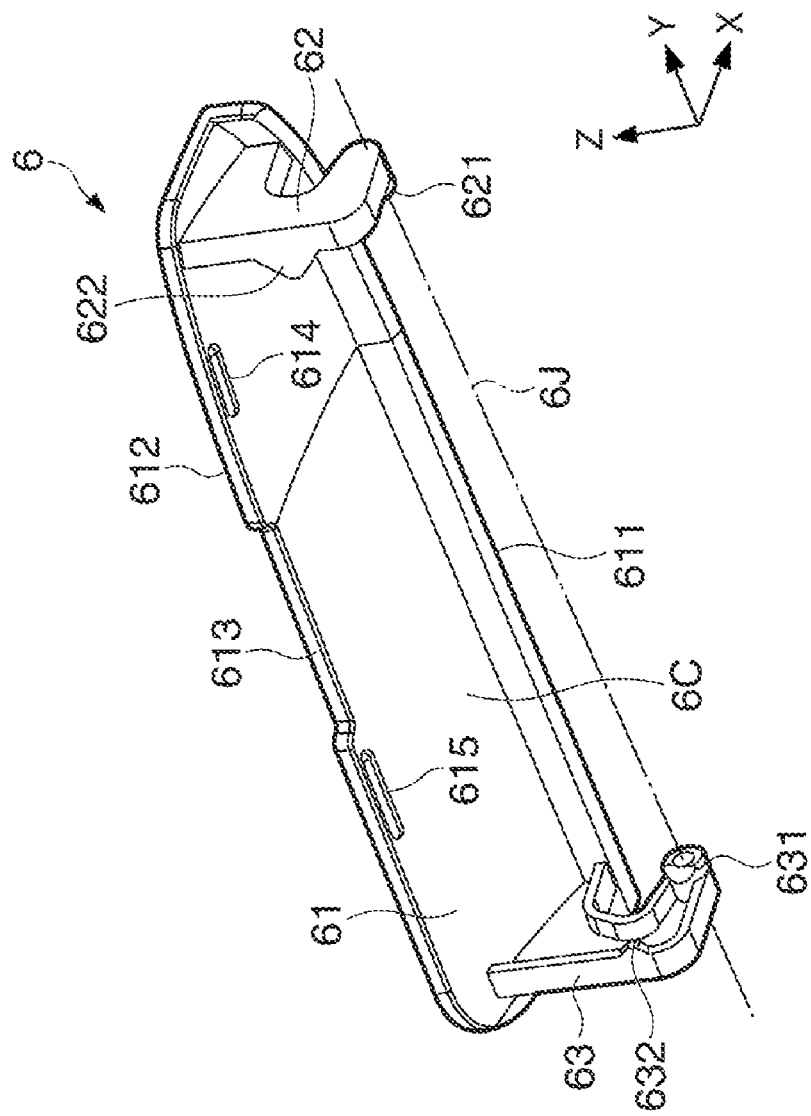
FIG. 8 is a perspective view of the cover.

FIG. 8 is a perspective view of the cover 6, showing the cover 6 in the closed condition as seen from below.

As shown in FIG. 8, a notch (a finger hook 613) is formed in an approximately central portion of an opposed side end 612 opposed to the intake side end 611 of the cover main body 61. Then, the control portion 614 and 615 protruding from a surface (an inner surface 6C) opposite to the upper surface 6A are formed at the front (in the +Y direction) and back (in the −Y direction) of the finger hook 613, respectively, in the vicinity of the opposed side end 612. The control portion 614 and 615 are formed in a rectangular parallelepiped shape in such a way that the front-back direction (±Y direction) is their longitudinal direction.

The control portion 614 and 615 are formed in such a way that they can make engagement with, respectively, the rectangular holes 215 and 216 in the cavity 210, as previously described.

Figure 9:
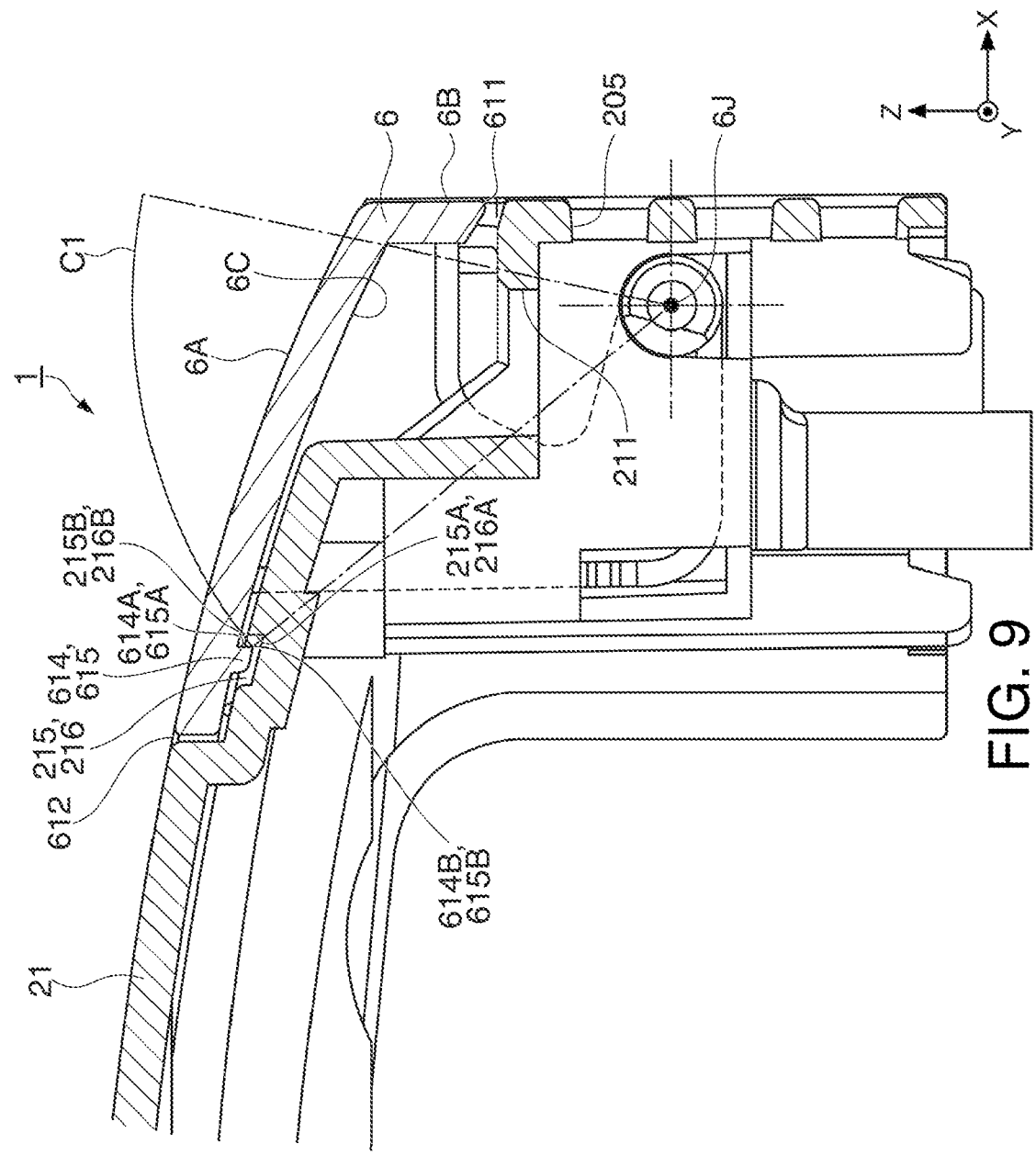
FIG. 9 is a perspective view of a vicinity of the cover in a closed condition when the projector is seen from the front.

FIG. 9 is a sectional view of a vicinity of the cover 6 in the closed condition when the projector 1 is seen from the front.

The control portion 614 and 615 being provided in the vicinity of the opposed side end 612 so as to protrude from the inner surface 6C, as previously described, are disposed in the rectangular holes 215 and 216, in the closed condition, as shown in FIG. 9. Specifically, the control portion 614 and 615 are disposed so that side surfaces 614A and 615A thereof on the intake side end 611 side face, and are slightly separated from, side surfaces 215A and 216A on the intake vent 205 side of the rectangular holes 215 and 216, respectively. In the closed condition, when the cover 6 is moved from the opposed side end 612 side to the intake vent 205 side, the side surfaces 614A and 615A make abutment with the side surfaces 215A and 216A, limiting a further movement. That is, the movement of the cover 6 from the opposed side end 612 side to the intake vent 205 side is limited by the control portion 614 and 615 being brought into engagement with the rectangular holes 215 and 216.

Also, as shown in FIG. 9, the control portion 614 and 615 are formed in such a way that a rotational trajectory C1 of edges 614B and 615B of the side surfaces 614A and 615A respectively when the cover 6 is rotated is positioned outside edges 215B and 216B of the side surfaces 215A and 216A respectively. That is, the cover 6 is rotated without the control portion 614 and 615 interfering with the edges of the rectangular holes 215 and 216.

The arms 62 and 63 being regions for the cover 6 to be rotatably supported on the exterior housing 2, are formed protruding from the inner surface 6C of the cover main body 61.

Specifically, as shown in FIG. 8, the arm 62, being provided at the front side (+Y side) end of the cover main body 61, after extending downward (in the −Z direction) from the inner surface 6C, bends and extends to the right (in the +X direction). Then, the columnar support 621 which, having a rotation axis 6J, protrudes to the back (in the −Y direction) is formed at the leading end of the arm 62. That is, the rotation axis 6J is formed in such a way as to be closer to the intake side end 611 than to the opposed side end 612. Also, the protrusion 622 protruding to the back (in the −Y direction) is formed in an approximately central portion of the arm 62.

As shown in FIG. 8, the arm 63, being provided at the back side (−Y side) end of the cover main body 61 is formed to be approximately symmetrical to the arm 62 with respect to the X-Z plane. Specifically, as shown in FIG. 8, the arm 63, after extending downward (in the −Z direction) from the inner surface 6C, bends and extends to the right (in the +X direction). Then, the columnar support 631 which, having the rotation axis 6J as its center, protrudes to the front (in the +Y direction) is formed at the leading end of the arm 63. Also, the protrusion 632 protruding to the front (in the +Y direction) is formed in an approximately central portion of the arm 63. The protrusions 622 and 632 correspond to latches.

In this way, the supports 621 and 631 with the same rotation axis 6J are formed opposed to each other on the arms 62 and 63 respectively.

Returning to FIG. 4, the cover 6, the opposed arms 62 and 63 thereof being positioned at the front and back of the restrainers 211A and 211B respectively, is rotatably supported by the supports 621 and 631 being fitted into the through holes 217 and 218 respectively. Specifically, the support 621 is fitted into the through hole 217 by being inserted thereinto from the front (+Y direction) of the restrainer 211A, while the support 631 is fitted into the through hole 218 by being inserted thereinto from the back (−Y direction) of the restrainer 211B. In this way, the supports 621 and 631 are rotatably supported by being fitted into the through holes 217 and 218 respectively from the mutually opposed sides. Also, the arms 62 and 63, being provided near the restrainers 211A and 211B respectively, are set in such a way that it is possible to suppress a rattle in a range in which the cover 6 can rotate smoothly. Then, the cover 6 is opened and closed by being rotated around the rotation axis 6J.

Returning to FIG. 5, as previously described, in the closed condition, the protrusions 622 and 632 of the cover 6 are latched in the latching holes 2121 and 2131 respectively, maintaining the closed condition. Also, as shown in FIG. 7, in the closed condition, the inner surface 6C of the cover 6 makes abutment with the grip 521 of the anti-dust filter 5.

Herein, a description will be given of an operation of the cover 6.

Figure 10:
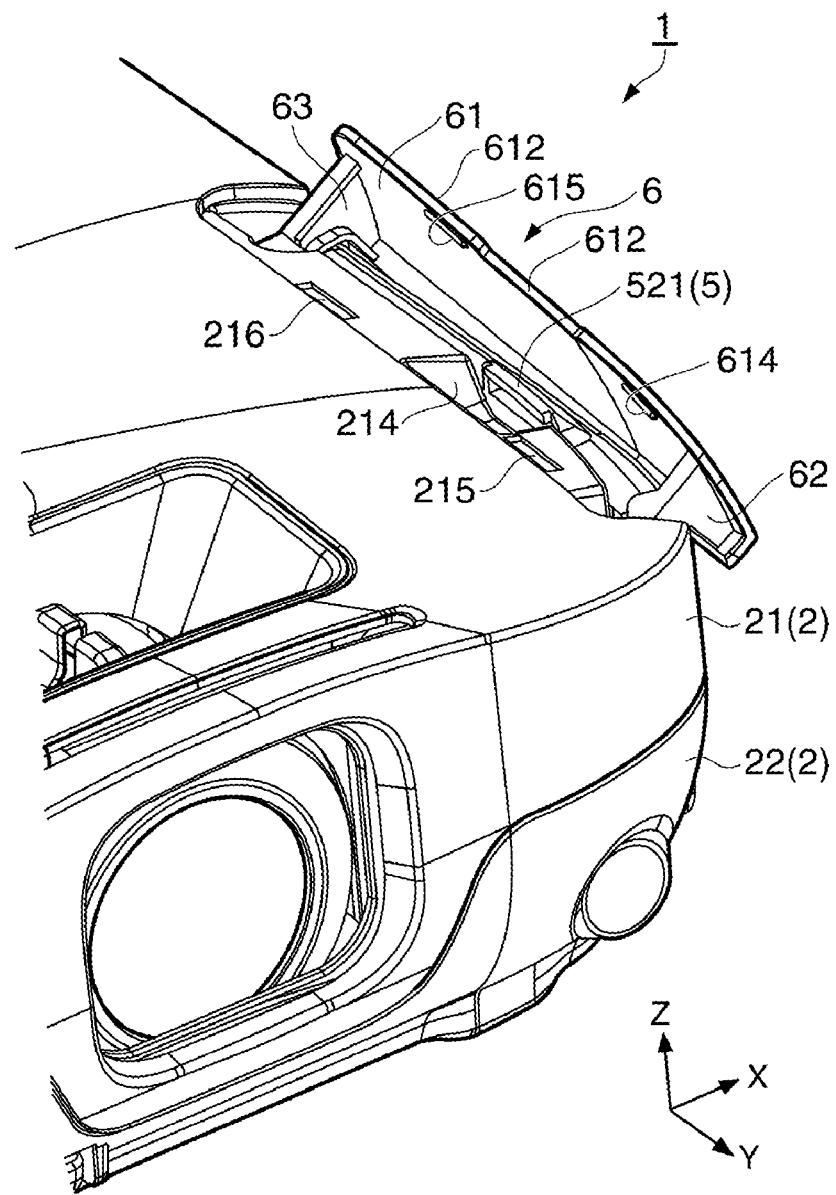
FIG. 10 is a perspective view of a vicinity of the cover in an open condition when the projector is seen from the front.
Figure 11:
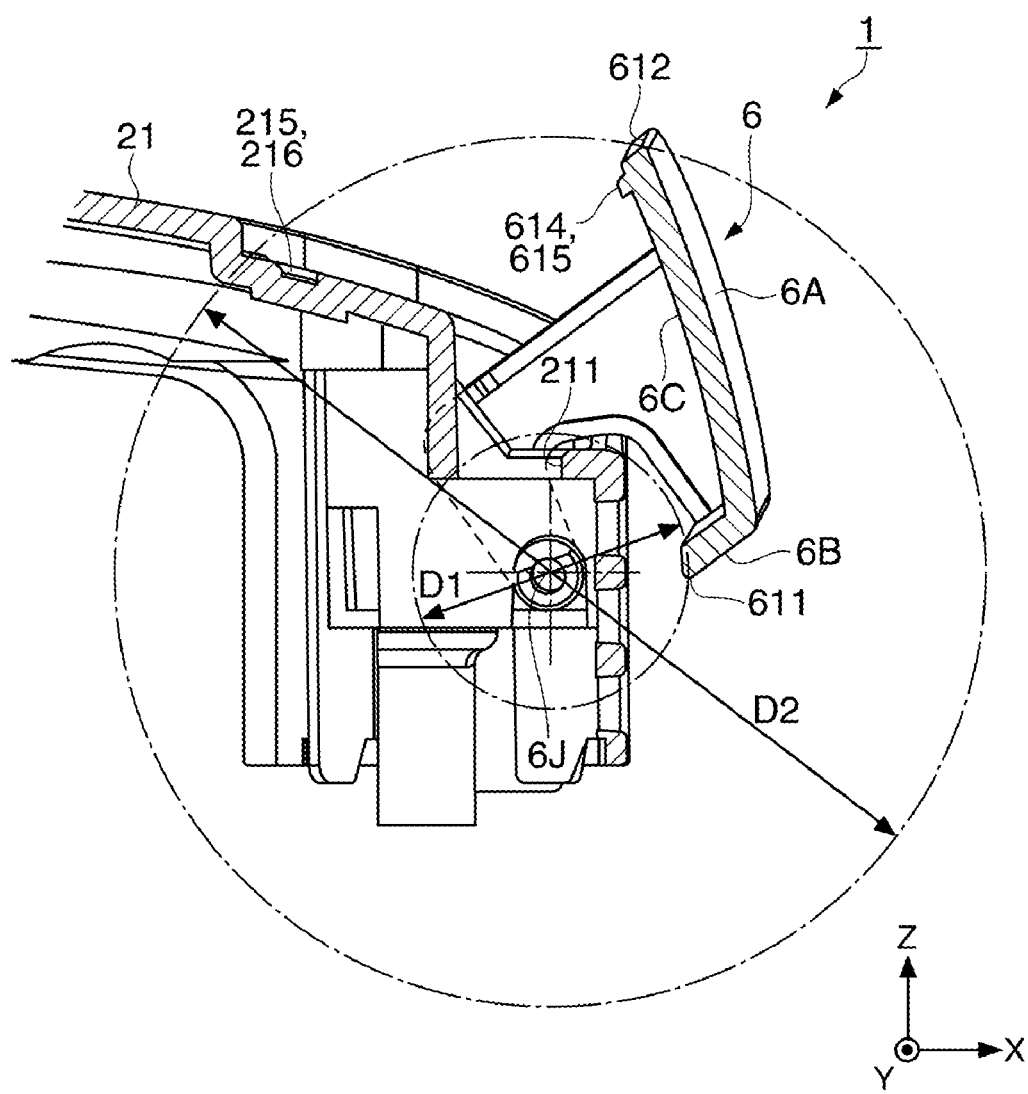
FIG. 11 is a sectional view of a vicinity of the cover in the open condition when the projector is seen from the front.

FIG. 10 is a perspective view of a vicinity of the cover 6 in the open condition when the projector 1 is seen from the front. FIG. 11 is a sectional view of a vicinity of the cover 6 in the open condition when the projector 1 is seen from the front.

The cover 6, on an upward force being applied to the opposed side end 612 side in the closed condition, rotates around the rotation axis 6J, and comes into the open condition, as shown in FIGS. 10 and 11.

Specifically, the cover 6 is configured so that, in the closed condition, on the user's fingertip being hooked in the finger hook 613, and an upward force being applied thereto, the protrusions 622 and 632 are released from being latched in the latching holes 2121 and 2131. Then, the cover 6 comes into a rotatable condition.

The cover 6 is configured so that, after the protrusions 622 and 632 are released from being latched, on a force in a further opening direction, that is, a force in a direction in which the opposed side end 612 moves sideward, being applied to the cover 6, as shown in FIG. 11, the intake side end 611 rotates with a rotational trajectory smaller than that of the opposed side end 612. More specifically, as shown in FIG. 11, the cover 6 rotates in such a way that a diameter D1 of the rotational trajectory of the intake side end 611 with the rotation axis 6J as its center is smaller than a diameter D2 of the rotational trajectory of the opposed side end 612 with the rotation axis 6J as its center. Then, the open condition is maintained once the cover 6 rotates up to a position in which the arm 62 and arm 63 make abutment with the inner wall of the upper case 21.

In the open condition, the grip 521 is exposed, as shown in FIG. 10, enabling the anti-dust filter 5 to be mounted and removed.

Meanwhile, in the open condition, the cover 6, on a force from the side being applied thereto, rotates in the opposite direction tracing a trajectory the same as the previously described rotational trajectory. Then, on the cover 6 being pressed downward from above, the protrusions 622 and 632 are latched in the latching holes 2121 and 2131, and the cover 6 comes into the closed condition.

As heretofore described, according to the projector 1 of the embodiment, it is possible to obtain the following advantages.

1. The projector includes the removably installed anti-dust filter 5 and the cover 6 which is switched between the open condition and closed condition. By this means, with the projector 1, as the ambient air is properly taken in over a long period by properly replacing the anti-dust filter 5, efficiently cooling the inside of the exterior housing 2, as well as it being possible to achieve a longer life span, it is possible, in the closed condition, to achieve an improvement in appearance design.

2. As the cover 6 is configured in such a way that, in the closed condition, the grip 521 makes abutment with the inner surface 6C of the cover 6, it is possible to prevent the anti-dust filter 5 from coming out of the insertion slot 211. Therefore, the anti-dust filter 5 being stably disposed in the predetermined position, it is possible to reliably prevent the intrusion of dust.

3. The anti-dust filter 5, as it is not exposed in the closed condition, can be used for exterior housings 2 of various specifications such as shapes, colors, and the like, without impairing their outer appearance. By this means, it being possible to standardize the anti-dust filter 5, it is possible to achieve a simplification of the anti-dust filter inventory control, and an enhancement in post-sale serviceability.

4. As the supports 621 and 631 are fitted in the through holes 217 and 218, the cover 6 is not separated from the exterior housing 2 in the open condition either, thus preventing a loss of the cover 6, a damage thereof accompanied by the cover 6 being handled separately, and the like, meaning that it is possible to stably provide the closed condition. Also, as the cover 6 is rotatably supported, the user can easily open and close the cover, meaning that it is possible to achieve an improvement in user friendliness.

5. The cover 6 is opened and closed in such a way that it is opened by the force in the direction in which the opposed side end 612 moves sideward being applied to the cover 6, and closed by the force from the side being applied to the cover 6. By this means, in the event that, in the closed condition, a force is applied to the cover 6 from the side when the user attempts to change a position of or lift the projector 1, a force in a closing direction is applied to the cover 6, meaning that it is possible to stably maintain the cover 6 in the closed condition. Therefore, it is possible to achieve an improvement in handleability of the projector 1.

6. In the closed condition, a movement of the cover 6 in a direction from the opposed side end 612 toward the intake vent 205 with respect to the upper case 21 is limited. By this means, in the closed condition, when the user carries the projector 1 by holding the vicinity of the side surface of the exterior housing 2, or the like, in the event that a force is applied to the cover 6 in the direction from the opposed side end 612 toward the intake vent 205, the cover 6 is prevented from being displaced, deformed, or the like. Therefore, as the cover 6 is configured so that the protrusions 622 and 632 are stably latched in the latching holes 2121 and 2131, it is possible to maintain the closed condition, and it is possible to achieve a further improvement in handleability of the projector 1.

7. The cover 6 is configured so that, when it is released from the closed condition, on the user's fingertip being hooked in the finger hook 613, and an upward force being applied thereto, a force such that the vicinity of the finger hook 613 bulges upward is applied to the finger hook 613, and a force in a direction in which the arms 62 and 63 come close to each other is applied to the arms 62 and 63. As the restrainers 211A and 211B are provided between the arms 62 and 63, a deformation in the direction in which the arms 62 and 63 come close to each other is prevented. By this means, the supports 621 and 631 being reliably supported without coming out of the through holes 217 and 218, it is possible to stably open and close the cover 6.

8. As the intake vent 205 is provided in the side surfaces 21C and 22C, it is difficult for dust to accumulate in the anti-dust filter 5 both in the position in which the projector 1 is left as placed, and in a "suspended from ceiling" position in which the projector 1 is installed with the top and bottom inverted as opposed to the "left as placed" position, in comparison with a case in which the intake vent 205 is provided in the top surface 21B or a bottom surface. Therefore, it being possible to reduce the frequency of replacement of the anti-dust filter 5, it is possible to achieve a simplification of post-sale services.

9. As the projector 1 is configured so that the anti-dust filter 5 can be mounted and removed from the top surface side of the exterior housing 2, the user can mount and remove the anti-dust filter 5 from below the projector 1 in the "suspended from ceiling" position. Therefore, the user can easily replace the anti-dust filter 5 without being constrained by a space between the projector 1 and a ceiling. Also, in the "left as placed" position, the user can replace the anti-dust filter 5 without moving the projector 1 whose projection position is set. Therefore, as it is not necessary to carry out a position setting of the projector 1 again after the replacement of the anti-dust filter 5, it is possible to reduce troublesomeness.

10. As the anti-dust filter 5 is formed in such a way as to provide a clicking sensation when the protrusion 522 is brought into engagement with the step 2111, it gives an indication when the user mounts the anti-dust filter 5 in the predetermined position of the exterior housing 2, enabling the anti-dust filter 5 to be stably mounted in a proper position.

11. As the anti-dust filter 5 is formed having the curvature following the side surface 21C, it being possible to make effective use of a space in the exterior housing 2, it is possible to achieve a downsizing of the projector 1, an improvement in cooling efficiency in the exterior housing 2 by securing a passage through which air circulates, and the like.

Modified Embodiments

It is also acceptable to modify the previously described embodiment in the following ways.

It is also acceptable to configure in such a way that the insertion slot 211 is provided in the bottom surface of the exterior housing 2, and the anti-dust filter 5 is mounted and removed from below.

It is also acceptable that the cavity 210 is configured of a member formed separately from the upper case 21.

In the previously described embodiment, a configuration is such that the supports 621 and 631 formed in a raised shape are fitted into the through holes 217 and 218 formed in a recessed shape, but it is also acceptable to configure in such a way that supports formed in a recessed shape are fitted onto raised-shape regions formed on the exterior housing 2.

Also, in the previously described embodiment, a configuration is such that the control portion 614 and 615 formed in a raised shape can make abutment with the rectangular holes 215 and 216 formed in a recessed shape, but it is also acceptable to configure in such a way that control portion formed in a recessed shape can make abutment with raised-shape regions formed on the exterior housing 2.

In the same way, in the previously described embodiment, a configuration is such that the latches (protrusions 622 and 632) formed in a raised shape are latched in the latching holes 2121 and 2131 formed in a recessed shape, but it is also acceptable to configure in such a way that latches formed in a recessed shape are latched to raised-shape regions formed on the exterior housing 2.

The projector 1 of the previously described embodiment uses the transmissive liquid crystal panels 352 as the optical modulation devices, but it is also acceptable that it is one utilizing reflective liquid crystal panels. Also, it is also acceptable that the optical modulation devices are ones making use of a device using a micromirror array, or the like.

The light source 311 not being limited to a discharge type lamp, it is also acceptable to configure it of a lamp of another type, or a solid light source such as a light emitting diode.

The projector 1 of the previously described embodiment is applied as a front type projector, but can also be applied to a rear type projector integrally including a screen as a projection subject surface.

The present application claim priority from Japanese Patent Application No. 2009-048924 filed on Mar. 3, 2009, which is hereby incorporated by reference in its entirety.

What is claimed is:

1. A projector configured to modulate a luminous flux emitted from a light source in accordance with image information, form an image light, and project the image light comprising:

an exterior housing having an intake vent for taking in ambient air, and an insertion slot communicating with the intake vent;

an anti-dust filter installed in the exterior housing so as to be mountable in and removable from the exterior housing through the insertion slot so as to prevent dust from intruding into the exterior housing from the intake vent; and a cover configured so as to be switchable between an open condition in which the cover exposes the insertion slot and a closed condition in which the cover covers the insertion slot, the cover including a cover main body which covers the insertion slot and arms extending from the cover main body so as to be rotatably supported on the exterior housing.

2. The projector according to claim 1, wherein
the intake vent is formed in a side surface of the exterior housing,
the insertion slot is adjacent to the intake vent such that the anti-dust filter can be mounted and removed in a direction along the side surface, and
the cover is configured such that an intake side end positioned on the intake vent side of the cover main body rotates with a rotational trajectory smaller than that of an opposed side end opposed to the intake side end.

3. The projector according to claim 2, wherein
the cover has a control portion configured to limit a movement from the opposed side end to the intake vent side.

4. The projector according to claim 1, wherein
the arms are formed as a pair on a same axis, and
the exterior housing includes restrainers provided between the pair of arms.

* * * * *